Oct. 14, 1947. D. J. DAVIS 2,429,181
MANUFACTURE OF PROPELLER BLADES
Filed April 5, 1943 2 Sheets-Sheet 1
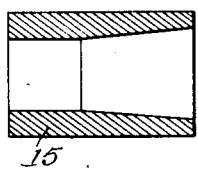
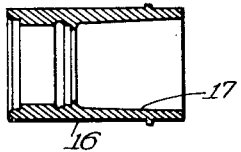
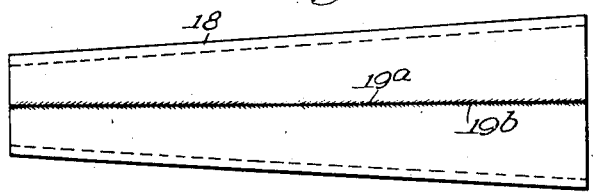
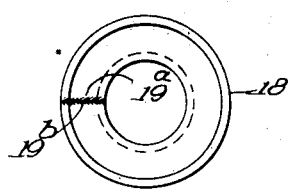
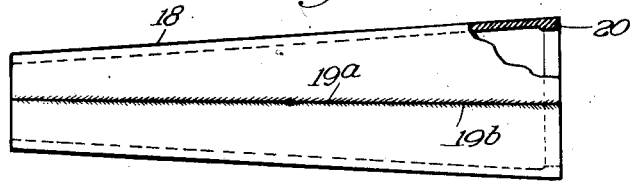
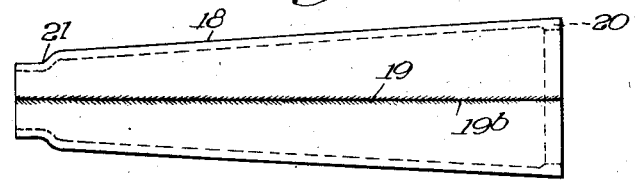
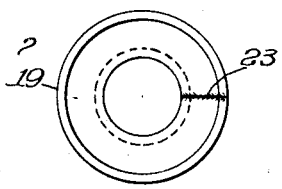
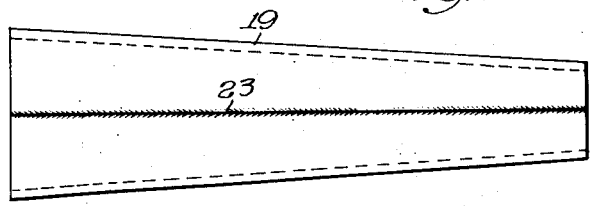
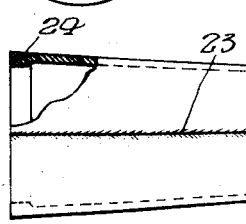
Inventor:
Dwillard J. Davis
By Fred Gerlach
his Atty.

Oct. 14, 1947.        D. J. DAVIS        2,429,181
MANUFACTURE OF PROPELLER BLADES
Filed April 5, 1943        2 Sheets-Sheet 2
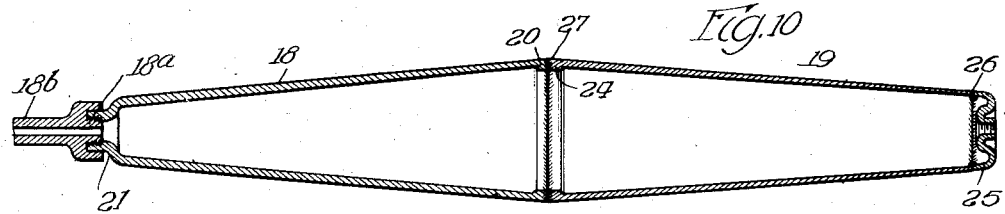
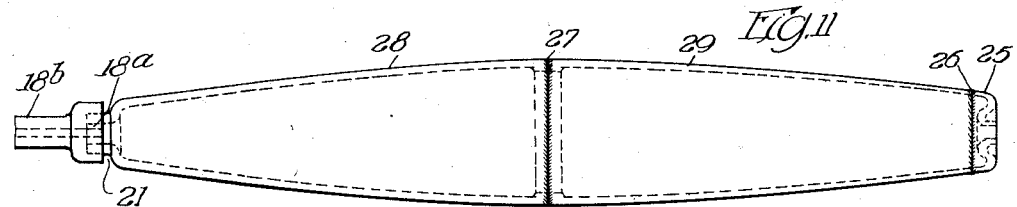
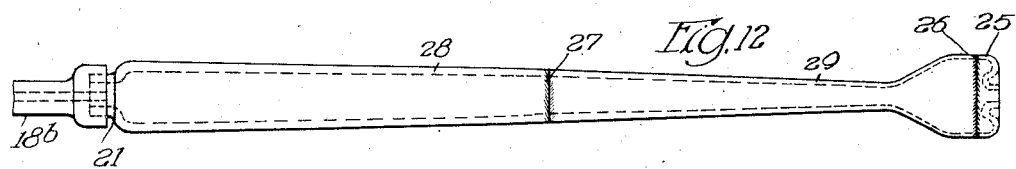
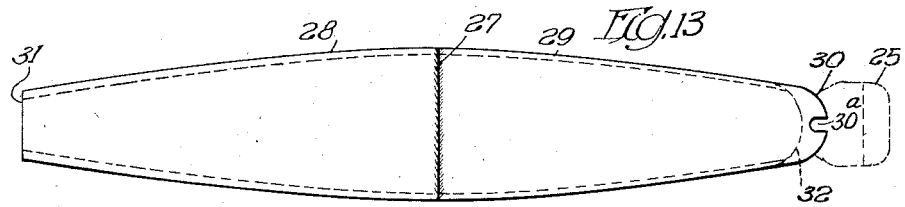
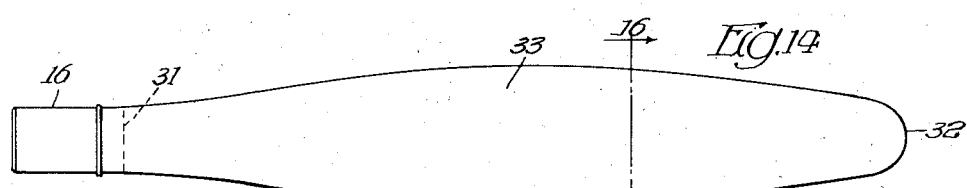
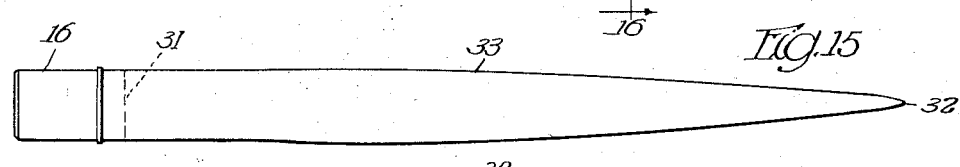
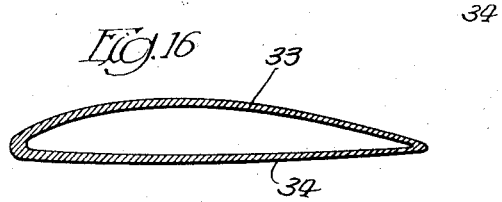
Inventor
Dwillard J. Davis
By Thed Gerlach, his Atty.

Patented Oct. 14, 1947

2,429,181

UNITED STATES PATENT OFFICE 2,429,181

MANUFACTURE OF PROPELLER BLADES

Dwillard J. Davis, Detroit, Mich., assignor to Avco Manufacturing Corporation, a corporation of Delaware Application April 5, 1943, Serial No. 481,793

14 Claims. (Cl. 29—156.8)

The invention relates to the fabrication of propeller blades.

One object of the invention is to provide an improved method of fabricating hollow steel propeller blades with the working portions of the blade formed of steel plates.

Another object of the invention is to provide a method of fabricating hollow propeller blades at a low cost of production.

Other objects of the invention will appear from the detailed description.

The invention consists in the several novel features hereinafter set forth and more particularly defined by claims at the conclusion hereof.

In the drawings:

Fig. 1 is a longitudinal section of the forged tubular blank for the shank which is adapted to be mounted in a propeller hub.

Fig. 2 is a longitudinal section of the shank after the tubular blank has been partially machined to fit in and for connection to a propeller hub.

Fig. 3 is a plan of the section formed of a plate of metal which has been rolled into a tubular conical section and is used to form the working portion of the blade approximately between its longitudinal center and the shank.

Fig. 4 is an end elevation of the section shown in Fig. 3.

Fig. 5 is a plan of the tubular conical blank section shown in Fig. 3 after its large end has been upset and faced for butt-welding it to the outer tubular conical section.

Fig. 6 is a plan of the same blank after its small end has been shaped to receive a fitting for introducing fluid under pressure into the joined inner and outer conical sections at a later stage in the fabrication of the blade.

Fig. 7 is a plan of the section which is formed of a plate of steel and rolled into tubular conical shape and which is used to form the blade from approximately its longitudinal center to and including the tip.

Fig. 8 is an end elevation of the section shown in Fig. 7.

Fig. 9 is an elevation of the section shown in Figs. 7 and 8 after its large end has been upset for welding it to the large end of the inner conical section.

Fig. 10 is a longitudinal section illustrating the inner and outer tubular conical section with their large ends butt-welded together.

Fig. 11 is a view illustrating the joined conical sections after they have been shaped to longitudinally curve their peripheral walls, for curved leading and trailing edges in the finished blade.

Fig. 12 is a side elevation of the structure illustrated in Fig. 11 after it has been partially flattened.

Fig. 13 is a plan of the structure shown in Fig. 12 after the closure has been removed from the tip portion of the blade.

Figs. 14 and 15 are plan and side elevations of the finished blade.

Fig. 16 is a section taken on line 16—16 of Fig. 14.

The invention provides for fabricating the working or airfoil portion of the blade from a pair of tubular or hollow conical sections 18 and 19 each of which is formed from a plate of steel and a tubular forged steel shank.

The blank from which the shank is formed consists of a tubular steel forging 15 illustrated in Fig. 1, or may be of steel tubing. This blank is first machined to the shape shown in Fig. 1, and later finished and machined so that its outer periphery 16 will be truly cylindrical and fit in a socket in the propeller hub, and its bore 17 will be shaped to receive the balancing weights and internally threaded for securing the blade against outward movement in the hub.

The blank-section 18 is fabricated from a flat plate of steel of uniform thickness which is first polished on one side. This flat plate is rolled into the tubular conical shape illustrated in Figs. 3 and 4 with the polished face on its inside. The longitudinal margins of the plate when rolled into conical shape are contiguous along the longitudinal line indicated at 19$^a$ in Figs. 3 and 4. The length of the blank-section 18 is sufficient to provide metal at its large end for upsetting and for trimming off a portion of the small end. Next the contiguous longitudinal edges of the plate are flash-welded together along the line 19$^b$. This welding may be done in an arc-welding machine arranged with an automatic traverse of the welding rod which is fed while traveling parallel with the seam to be welded and arranged so that the welding flux in granular form is fed simultaneously with the welding rod so that the arc is constantly submerged within the flux.

Next, the tubular conical section 18 is machined to gradually decrease its wall-thickness from its small to its large end for tapered wall-thickness from the shank to approximately the longitudinal center of the blade. The large end of the tubular section 18 is then upset as illustrated at 20 in Fig. 5, and then faced for butt-welding it to the conical outer blank section. The small end of the conical section 18 is then spun or upset to form a portion 21 of reduced diameter and internally threaded to receive a fitting 18ª for closing this end of the conical section and connecting it to a pipe 18ᵇ for delivering a suitable fluid under pressure to the assembled sections 18 and 19 during subsequent steps in the fabrication of the blade.

The outer blank-section 19 of the blade is produced from a plate of metal, one face of which has been polished. This plate is rolled into the tubular conical shape illustrated in Figs. 7 and 8 with the polished face inside. The edges of the plate are contiguous along the line 23. The contiguous edges are then welded together. The blank-section 19 is of sufficient length for upsetting its large end and for trimming off some of its small end, in forming the tip of the blade. The large end of the conical section 19 is next upset as at 24 and faced for butt-welding to the large end of the conical section 18. The section 19 is then machined to gradually reduce its wall-thickness from its large end to its small end, as illustrated in Fig. 9. If desired, sheet blanks having the desired tapering wall-thickness may be used and the machining step omitted. Each of these tubular sections 18 and 19 is adapted to form the suction and pressure faces and leading and trailing edges of approximately one-half of the working portion of the blade.

Next, the faced ends of upset portions 20 and 24 of the sections 18, 19 which are of the same diameter are butt-welded together, as illustrated at 27 in Fig. 10, so that they will taper longitudinally toward both ends. An inert gas may be supplied to the space within the joined sections 18 and 19 during this welding operation. Next, a cap or fitting 25 for closing the small end of the conical blank-section 19 is welded, as at 26, to said end. The joined sections 18, 19 will then provide a closed chamber which is adapted to retain fluid under pressure.

Next, the joined sections 18 and 19 are heated and confined between suitable dies while internal pressure is maintained by a suitable fluid under pressure from pipe 18ᵇ within the joined sections 18 and 19 so that the straight conical walls of said sections will be expanded to continuous longitudinally curved tubular contour, as illustrated at 28 and 29, for subsequent formation of longitudinally curved leading and trailing edges.

Next, the joined sections 18 and 19 of the blank are partially flattened between their end-portions, as illustrated in Fig. 12 and to the plan form substantially as illustrated in Fig. 13. It may be noted that fluid under substantially constant pressure is supplied by pipe 18ᵇ and the pressure within the blade is maintained substantially constant during the flattening operation.

Next, the tip portion of the blank and cap 25 will be cut off on the line 30, as illustrated in Fig. 13, to remove the cap 25 and the weld 26 from the blank. Next, the tip end of the blank will be welded together. When the cap 25 was cut off a notch 30ª was cut in the end of the blade. This serves to accurately index the blade for the next forming operation. After the cap 25 has been removed and the tip welded substantially along the line 22, the blade is heated and placed between forming dies while internal fluid pressure is maintained within the blade from the pipe 18ᵇ. The blade which is now substantially in its final shape is die-quenched by passing a suitable cooling fluid through conduits in the dies. The blade is then sheared off at 32 conformably to the tip contour. Next, the fitting 18ª and the portion of the blank is cut off on the line 31 to provide an end-face which can be joined to the shank. One end of the machined shank is then butt-welded to the inner end of the shaped blade.

The blade will then be polished or ground and then die-quenched to form the finished blade. In some instances it is desirable to provide greater wall-thickness at the leading and trailing edges of the finished blade than in the zones between the edges in the suction and pressure faces of the blade. When this is desired, the wall-thickness may be correspondingly reduced by cutting away the desired zones from the tubular blanks 18 and 19 after they have been welded together. In joining the tubular sections 18 and 19, the seams 19ᵇ and 23 may be aligned and in the subsequent shaping to airfoil contour the line of weld may be extended across the trailing edge so that the leading edge of the blade will be seamless, except at the butt-weld between the blank sections 18 and 19.

The invention exemplifies a method of fabricating hollow steel propeller blades from a pair of plates of steel rolled into conical shapes with the longitudinal edges of the plates contiguous and welded together to provide tubular sections which when their large ends are welded together, form a blank which is tapered from approximate mid-length to the tip and shank for shaping into airfoil working faces and leading and trailing edges. The entire blade is produced from a pair of plates and a tubular section and can be fabricated with few welded joints.

The invention is not to be understood as restricted to the details set forth since these may be modified within the scope of the appended claims without departing from the spirit and scope of the invention.

Having thus described the invention, what I claim as new and desire to secure by Letters Patent is:

1. That improvement in the fabrication of hollow steel propeller blades which comprises: working a pair of plates of steel, each into a conical tubular blank-section with their large ends of substantially the same diameter; welding together contiguous longitudinal edges of the plate in each section; welding together the large ends of the conical sections to form a blank having its greater diameter at mid-length thereof and converging toward both of its ends; shaping the blank to form inner and outer oppositely convergent longitudinally extending working portions of air foil cross-section having a greater transverse dimension substantially at mid-length of said blank and with leading and trailing edges, and to form a tip at the small outer end of the outer portion; and securing a shank-section to the small inner end of said inner portion.

2. That improvement in the fabrication of hollow steel propeller blades which comprises: working a pair of plates of steel, each into a conical tubular blank-section with their large ends of substantially the same diameter; welding together contiguous longitudinal edges of the plate in each section; upsetting the larger ends of the conical sections; welding together the large upset ends of the conical sections to form a blank having its greater diameter at mid-length thereof and converging toward both of its ends; shaping the blank to form inner and outer oppositely convergent longitudinally extending working portions of air foil cross-section having a greater transverse dimension substantially at mid-length of said blank and with leading and trailing edges, and to form a tip at the small outer end of the outer portion; and securing a shank-section to the small inner end of said inner portion.

3. That improvement in the fabrication of hollow steel propeller blades which comprises: working a pair of plates of steel, each into a conical tubular blank-section with their large ends of substantially the same diameter; welding together contiguous longitudinal edges of the plate in each section; machining the outer periphery of the sections for tapering wall thickness; welding together the large upset ends of the conical sections to form a blank having its greater diameter at mid-length thereof and converging toward both of its ends; shaping the blank to form inner and outer oppositely convergent longitudinally extending working portions of air foil cross-section having a greater transverse dimension substantially at mid-length of said blank and with leading and trailing edges, and to form a tip at the small outer end of the outer portion; and securing a shank-section to the small inner end of said inner portion.

4. That improvement in the fabrication of hollow steel propeller blades which comprises: working a pair of plates of steel, each into a conical tubular blank-section with their large ends of substantially the same diameter; welding together contiguous longitudinal edges of the plate in each section; upsetting the larger ends of the conical sections; machining the outer periphery of the sections for tapering wall thickness; welding together the large upset ends of the conical sections to form a blank having its greater diameter at mid-length thereof and converging toward both of its ends; shaping the blank to form inner and outer oppositely convergent longitudinally extending working portions of air foil cross-section having a greater transverse dimension substantially at mid-length of said blank and with leading and trailing edges, and to form a tip at the small outer end of the outer portion and a connection for a shank-section at the inner end of the inner portion; and securing a shank-section to the inner end of said inner portion.

5. That improvement in the fabrication of hollow steel propeller blades which comprises: working a pair of plates of steel, each into a conical tubular blank section with their large ends of substantially the same diameter; welding together contiguous longitudinal edges of the plate in each section; welding together the large ends of the conical section to form a blank having its greater diameter at mid-length thereof and converging toward both ends; shaping the blank to form a continuously curved longitudinally extending tubular wall with its greater dimension at mid-length; shaping the longitudinally curved blank to form inner and outer oppositely convergent working blade portions of air foil cross-section with longitudinally curved leading and trailing edges and having a greater transverse dimension at mid-length of the blank, and to form a tip on the smaller end of the outer portion and a shank-connection at the inner end of the inner portion; and securing a shank section to the inner end of said inner portion.

6. That improvement in the fabrication of hollow steel propeller blades, which comprises: working a pair of plates of steel, each into a conical tubular blank section, with their large ends of substantially the same diameter; upsetting the large ends of the sections; welding together contiguous longitudinal edges of the plate in each section; butt welding together the large upset ends of the conical sections to form a blank having its greater diameter at mid-length thereof and converging toward both ends; shaping the blank to form a continuously curved longitudinally extending tubular wall with its greater dimension at mid-length; shaping the longitudinally curved blank to form inner and outer oppositely convergent working blade portions of air foil cross-section with longitudinally curved leading and trailing edges and having a greater transverse dimension at mid-length of the blank and to form a tip on the smaller end of the outer portion and a shank-connection on the inner end of the inner portion; and securing a shank-section to the inner end of said inner portion.

7. That improvement in the fabrication of hollow steel propeller blades which comprises: rolling a pair of plates of steel, each into a conical tubular blank-section, with their large ends of substantially the same diameter; upsetting the large ends of the sections; machining the outer periphery of the sections for tapered wall-thickness; welding together contiguous longitudinal edges of the plate in each section; butt welding together the large ends of the conical sections to form a blank having its greater diameter at mid-length thereof and converging toward both ends; re-shaping the blank to form a continuous longitudinally curved tubular wall with its greater dimension at mid-length; shaping the longitudinally curved working portions of air foil cross-section with greater transverse dimension at mid-length of the blank, and longitudinally curved leading and trailing edges substantially from end to end of the blank, and to form a tip on the smaller end of the outer portion; and securing a shank-section to the small inner end of said inner portion.

8. That improvement in the fabrication of hollow steel propeller blades which comprises: rolling a pair of plates of steel having a polished face, each into a conical tubular blank-section, with their large ends of substantially the same diameter and with the polished face on the inside; welding together contiguous longitudinal edges of the plate in each section; welding together the large ends of the conical section to form a blank having its greater diameter at mid-length thereof and converging toward both ends; shaping the blank to form inner and outer oppositely convergent longitudinally working portions of air foil cross-section with longitudinally curved leading and trailing edges substantially between the ends of the blank and having a greater transverse dimension at mid-length of the blank and to form a tip at the smaller end of the outer portion; and welding a shank-section to the inner end of said inner portion.

9. That improvement in the fabrication of hollow steel propeller blades which comprises: welding together the large ends of equal diameter of a pair of conical completely tubular blank sections to form a blank having its greater diameter at mid-length thereof and converging toward both ends; and shaping the portions of the blank to form longitudinal inner and outer oppositely convergent working portions of air foil cross-section with longitudinally curved leading and trailing edges substantially from end to end of the blank with the greater transverse dimension at mid-length of the blank and to form a tip at the small- 10. That improvement in the fabrication of hollow steel propeller blades which comprises: welding together the large ends of equal diameter of a pair of conical completely tubular blank-sections to form a blank having its greater diameter at mid-length thereof and converging toward both ends; shaping the blank to form a longitudinally curved tubular wall with its greater dimension at mid-length and converging longitudinally toward its ends; and shaping the portions of the blank to form inner and outer oppositely convergent working portions of air foil cross-section with longitudinally curved leading and trailing edges substantially from end to end of the blank with the greater transverse dimension at mid-length of the blank and to form a tip at the smaller end of the outer portion; and securing a shank-section to the small inner end of said inner portion.

11. That improvement in the fabrication of hollow steel propeller blades which comprises: welding together the large ends of equal diameter of a pair of conical completely tubular blank-sections to form a blank having its greater diameter at mid-length thereof and converging toward both ends; machining the sections to provide tapering wall-thickness; shaping the blank to form a longitudinally curved tubular wall with its greater dimension at mid-length and converging longitudinally toward its ends; and shaping the portions of the blank to form inner and outer oppositely convergent longitudinally extending working portions of air foil cross-section with longitudinally curved leading and trailing edges substantially from end to end of the blank with the greater transverse dimension at mid-length of the blank and to form a tip at the smaller end of the outer portion; and securing a shank-section to the small inner end of said inner portion.

12. That improvement in the fabrication of hollow steel propeller blades which comprises: welding together the large ends of equal diameter of a pair of conical completely tubular blank-sections to form a blank having its greater diameter at mid-length thereof and converging toward both ends; shaping the blank to form a longitudinally curved tubular wall with its greater dimension at mid-length and converging longitudinally toward its ends; and partially flattening the blank, shaping the portions of the partially flattened blank to form inner and outer longitudinally extending oppositely convergent working portions of air foil cross-section with longitudinally curved leading and trailing edges substantially from end to end of the blank with the greater transverse dimension at mid-length of the blank and to form a tip at the smaller end of the outer portion; and securing a shank-section to the small inner end of said inner portion.

13. That improvement in the fabrication of hollow steel propeller blades which comprises: butt welding together the large ends of a pair of completely tubular conical blank sections having their large ends of equal diameter and provided with upset portions to form a blank having its greater diameter at mid-length thereof and converging toward both ends; machining the outer periphery of the blank for varying wall thickness; shaping the blank to form a continuous longitudinally curved tubular wall with its greater diameter at mid-length; shaping the longitudinally curved blank to form inner and outer oppositely convergent working portions of air foil cross-section with longitudinally curved leading and trailing edges substantially from end to end of the blank with the greater transverse dimension at mid-length of the blank; shaping the smaller end of the outer portion to tip contour; and securing a shank-section to the inner end of said inner portion.

14. That improvement in the fabrication of hollow steel propeller blades which comprises: welding together the large ends of equal diameter of a pair of completely tubular conical blank sections to form a blank having its greater diameter at mid-length thereof and converging toward both ends; welding closure fittings to the small ends of the blanks; partially flattening the blank under internal pressure; trimming the small ends of the blank to remove the fittings; shaping portions of the flattened blank to form inner and outer longitudinally extending oppositely convergent working portions of air foil cross-section with longitudinally curved leading and trailing edges substantially from end to end of the blank with the greater transverse dimension at mid-length of the blank and to form a tip at the smaller end of the outer portion; and securing a shank-section to the small inner end of said inner portion.

DWILLARD J. DAVIS.

REFERENCES CITED

The following references are of record in the file of this patent:

UNITED STATES PATENTS

| Number | Name | Date |
| --- | --- | --- |
| 2,056,592 | Siddeley | Oct. 6, 1936 |
| 2,298,132 | Johnson | Oct. 6, 1942 |
| 1,996,850 | Bendix | Apr. 9, 1935 |
| 1,947,347 | Lorenzen | Feb. 13, 1934 |
| 1,869,478 | Heath | Aug. 2, 1932 |
| 1,916,027 | Weinberg | June 27, 1933 |
| 1,682,403 | Murray | Aug. 28, 1928 |
| 1,671,402 | Brown | May 29, 1928 |
| 1,998,593 | Jungren | Apr. 16, 1935 |
| 2,298,132 | Johnson | Oct. 6, 1942 |
| 1,920,830 | Wylie | Aug. 1, 1933 |
| 1,952,569 | Smith | Mar. 27, 1934 |
| 1,988,202 | Hoover | Jan. 15, 1935 |
| 2,004,102 | Dickey | June 11, 1935 |
| 2,087,919 | Mascuch | July 27, 1937 |
| 1,750,834 | Carns | Mar. 18, 1930 |

FOREIGN PATENTS

| Number | Country | Date |
| --- | --- | --- |
| 449,254 | Germany | Sept. 8, 1927 |